July 1, 1941.  E. CHIAL  2,247,723
TREE TRIMMER
Filed Sept. 29, 1938   2 Sheets-Sheet 1

Emil Chial INVENTOR.
BY Snowles
ATTORNEYS.

July 1, 1941.  E. CHIAL  2,247,723
TREE TRIMMER
Filed Sept. 29, 1938  2 Sheets-Sheet 2
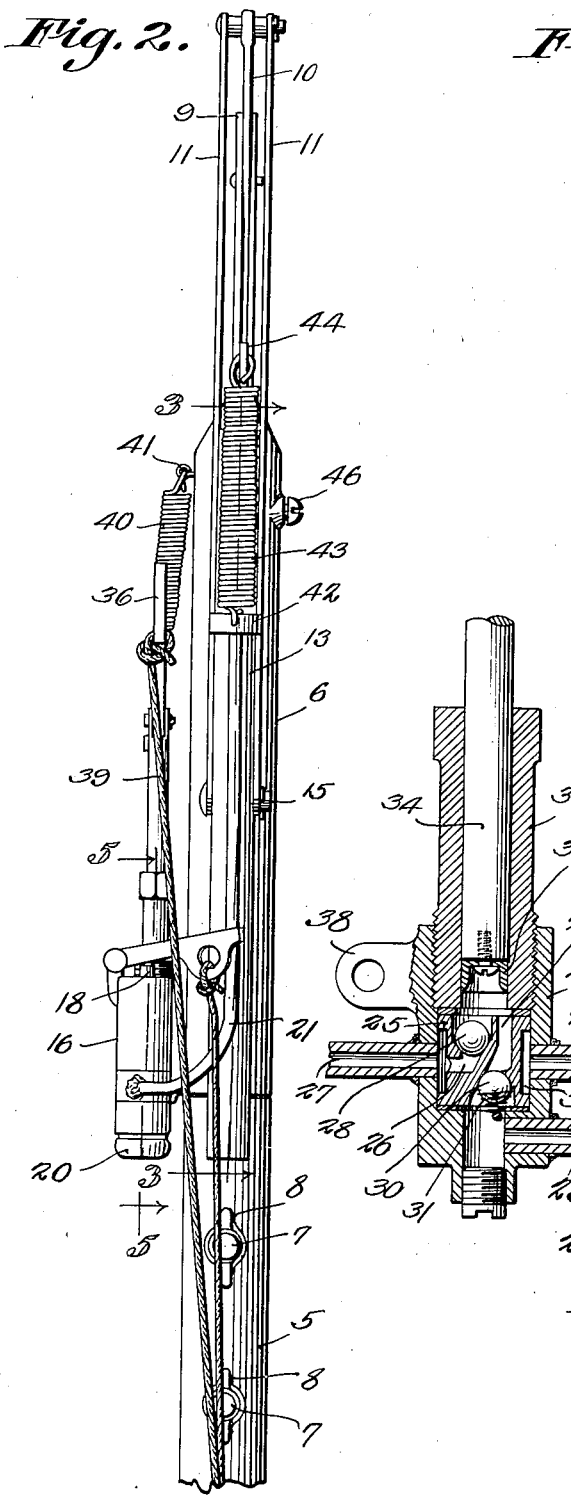
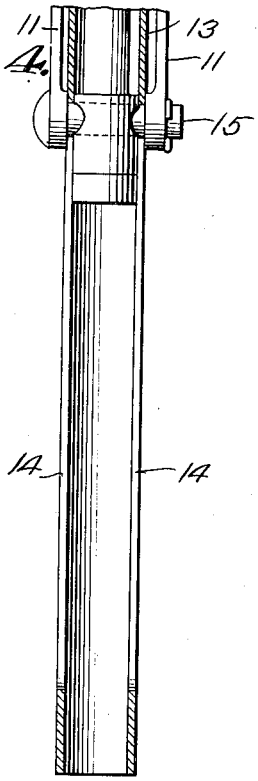
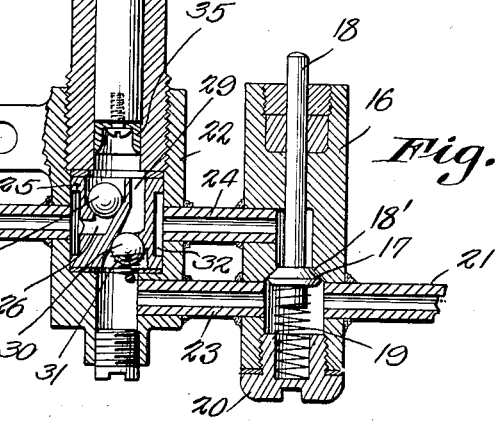
Emil Chial
INVENTOR.
BY *C. A. Snow & Co.*
ATTORNEYS.

Patented July 1, 1941

2,247,723

UNITED STATES PATENT OFFICE 2,247,723

TREE TRIMMER

Emil Chial, Stillwater, Minn.

Application September 29, 1938, Serial No. 232,438

2 Claims. (Cl. 30—187)

This invention relates to tree trimmers, and particularly to tree trimmers of the type used in trimming and cutting limbs of trees at remote distances from the operator.

An important object of the invention is to provide a trimmer wherein the blade thereof is actuated by hydraulic pressure directed to the blade operating rod, thereby providing a trimmer which may be easily actuated in restricted places wherein it would be practically impossible to operate the well known trimmer having the usual lever actuated blade control rod.

A further object of the invention is to provide a cutter wherein excessive pressure may be directed to the blade, to the end that large or tough branches may be readily trimmed or removed, which could not be cut by the pivoted blade actuated by the usual lever actuated rod forming a part of tree trimmers.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 2 is a rear elevational view thereof.

Figure 4 is a sectional view taken on line 4—4 of Figure 3.

Figure 5 is a sectional view taken on line 5—5 of Figure 2.

Figure 1:
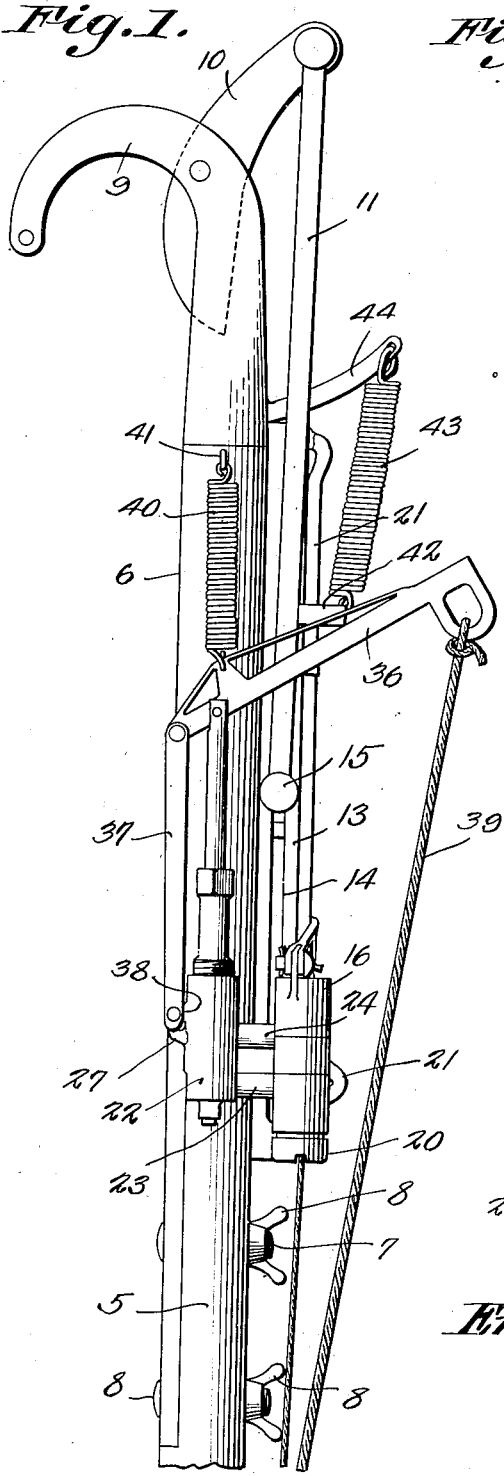
Figure 1 is a side elevational view of a trimmer constructed in accordance with the invention.

Referring to the drawings in detail, the reference character 5 designates the supporting pole of the trimmer, to which the tank 6 is secured, as by means of the bolts 7 and winged nut 8. Formed at the outer end of the tank 6, is a hook 9 which is adapted to be hooked over a branch or limb to be cut, to hold the trimmer in position, during the cutting operation.

Pivotally mounted on the hook 9 is a blade indicated by the reference character 10, which blade cooperates with the hook 9 in trimming a limb, or cutting a limb from a tree.

Figure 3:
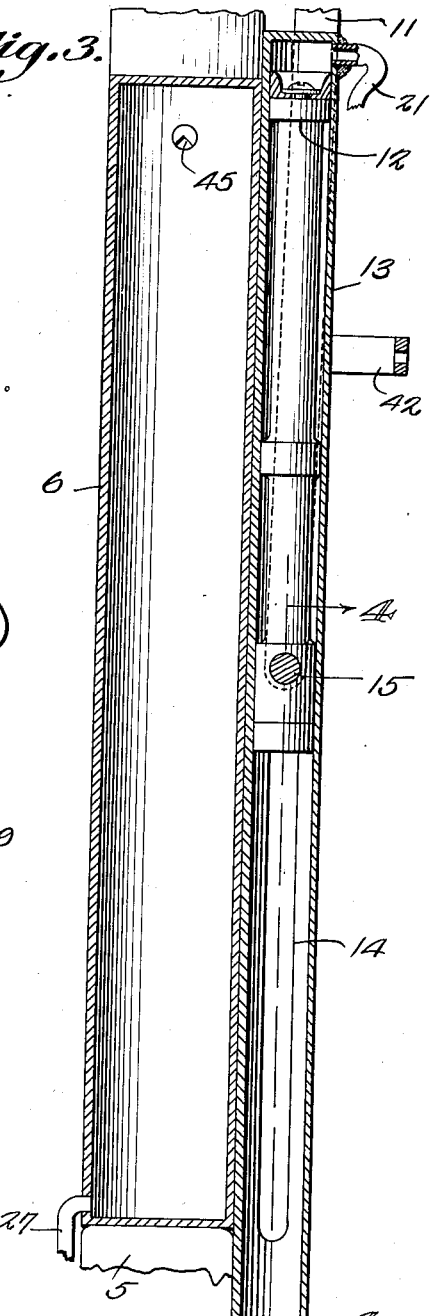
Figure 3 is a sectional view taken on line 3—3 of Figure 2.

As shown, one end of the blade extends an appreciable distance beyond the hook, where it has pivotal connection with the rods 11 that have their lower ends pivotally connected to the lower end of the piston 12, that moves in the cylinder 13 mounted at one side of the tank 6, as clearly shown by Figure 3 of the drawings. The cylinder 13 is substantially long, and has elongated openings 14 formed in opposite sides thereof, the openings providing clearances for the pivot pin 15, to which the lower end of the piston 12 is connected, the pivot pin also providing means for connecting the rods 11 to the piston.

Supported on the tank 6, near the lower end thereof is a valve chamber 16 in which the valve 17 operates, the stem 18 of the valve 17 extending through the upper end of the valve chamber 16, where it may be engaged by the finger of the operator to move the valve 17 to its open position, for purposes to be hereinafter described. Normally the valve 17 seats against the valve seat 18', under the action of the coiled spring 19 that is shown as positioned in an opening of the screw threaded closure cap 20, the opposite end of the spring contacting with the valve.

Communication between the valve chamber 16 and the upper end of the cylinder 13, is established through the pipe 21 so that liquid may pass through the valve chamber 16, directly to the upper end of the cylinder 13, for operating the piston 12. Disposed adjacent to the valve chamber 16 is a valve chamber 22 which is in communication with the valve chamber 16, through the pipe 23, the upper portion of the valve chamber 22 being in communication with the valve chamber 16, through the pipe 24. Secured within the valve chamber 22 is a housing 25 which has a bore 26 in direct alignment with the pipe 27 that leads to the tank 6, so that liquid passing from the tank 6 may enter the bore 26, through said pipe 27.

The upper end of the bore 26 is enlarged and formed to provide a valve seat for the ball valve 28. A bore 29 is also formed in the housing 25, the bore 29 being formed with a valve seat at its lower end, against which the ball valve 30 seats, under normal conditions, the ball valve 30 being urged to its seat by means of the coiled spring 31 which is disposed directly thereunder. The outer surface of the housing 25 is formed with a cut-out portion defining an annular passageway 32, the passageway 32 being in communication with the pipe 24 at one side of the valve chamber 22, while at the opposite side of the housing 25, the annular passageway 32 communicates with the pipe 27.

Supported by the valve chamber 22 and extending upwardly therefrom, is a pump cylinder indicated by the reference character 33, in which the piston 34 operates, the piston carrying a washer 35 at its lower end. Pivotally connected with the upper end of the piston 34 is an operating lever 36, which has one of its ends pivotally connected to the link 37 that in turn has its lower end pivotally connected to the ear 38 extending from the valve chamber 22. The opposite end of the operating lever 36 is formed with an opening through which one end of the cable 39 extends, the cable 39 being secured to the operating lever 36. A coiled spring indicated at 40 has connection with the operating lever 36, the opposite end of the spring 40 being secured to the tank 6, at 41, the action of the spring being to normally urge the operating lever 36 upwardly, or to its inactive position.

Extending laterally from the rods 11, is an arm 42, to which one end of the coiled spring 43 is secured. The opposite end of the coiled spring 43 is secured to the arm 44 that extends from the hook member 9, the spring 43 acting to normally urge the blade 10 to its inactive position, or to the position as shown by Figure 1 of the drawings.

An opening 45 is formed in the tank 6 near the upper end thereof and is provided so that liquid may be placed into the tank 6. This opening also acts as a vent opening so that air may enter the cylinder to displace the liquid pumped therefrom. The size of the opening may be regulated by the screw 46 which is shown as provided with a tapered extremity extended into the opening.

In the use of the device, the hook 9, is positioned over the branch or limb to be removed. The cable 39 is now pulled downwardly and released. This movement is repeated, causing a pumping action of the piston 34, which draws liquid from the tank 6, into the pump cylinder 33, and forces the liquid through the bore 29 and into the pipe 23, through the valve chamber 16 and pipe 21. The liquid is now discharged into the upper end of the cylinder 13, forcing the piston 12 downwardly with the resultant downward movement of the rods 11. As the rods 11 move downwardly, it is obvious that the cutting edge of the pivoted blade 10 is moved into contact with the branch or limb to be removed. As the pressure increases in the cylinder 13, the blade is forced through the branch or limb.

The valve stem 18 is now pressed downwardly unseating the valve 17. The action of the spring 43 will return the rods 11 and blade 10 to their normal positions, forcing the liquid through the pipe 21, valve chamber 16, pipe 24, and into the annular passageway 32, where the liquid is returned to the tank 6, through pipe 27.

I claim:

1. A hydraulic pruning apparatus comprising a pole, a liquid-containing tank mounted on the pole, a hook secured to one end of the tank, a pivoted blade mounted on the hook and cooperating with the hook in pruning trees, a main cylinder mounted at one side of the tank and disposed longitudinally thereof, an elongated piston operating in the cylinder, rods connected with the lower end of the elongated piston, said rods being also connected with the pivoted blade, means for establishing communication between the tank and main cylinder, said means comprising a pump cylinder and pipes leading from the pump cylinder to the main cylinder, valves for controlling the passage of liquid from the pump cylinder to the main cylinder, a pump operating in the pump cylinder and adapted to force liquid from the tank into the upper end of the main cylinder, operating the piston and pivoted blade, and a manually controlled valve adapted to be operated whereby liquid from the main cylinder may pass to the tank, and a spring for moving said pivoted blade and piston to their normal inactive positions.

2. A hydraulic pruning apparatus comprising a pole, a tank mounted on the pole, a hook at one end of the tank, a pivoted blade mounted on the hook and cooperating with said hook in pruning trees, a main cylinder, a piston operating in the main cylinder, means for transmitting movement of the piston to said pivoted blade, means for controlling the passage of liquid between the tank and main cylinder, said means including a valve chamber, a valve housing mounted in the valve chamber and having an annular passageway formed exteriorly thereof, said valve housing having valve-controlled passageways therein, valves in the valve chamber adapted to control the passage of liquid from said tank to the cylinder, a pump adapted to draw liquid from the tank and force the liquid into the main cylinder, yieldable means adapted to return the piston operating in the main cylinder, to its inactive position, and a manually operated valve adapted to control the return passage of liquid from the main cylinder through the annular passageway to the tank.

EMIL CHIAL.